(12) United States Patent
Wang

(10) Patent No.: US 9,395,879 B2
(45) Date of Patent: Jul. 19, 2016

(54) ICON OPERATION METHOD AND ICON OPERATION MODULE

(75) Inventor: Yi-Hua Wang, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 1251 days.

(21) Appl. No.: 12/548,436

(22) Filed: Aug. 27, 2009

(65) Prior Publication Data

US 2010/0058244 A1 Mar. 4, 2010

(30) Foreign Application Priority Data

Sep. 1, 2008 (TW) .............................. 97133446 A

(51) Int. Cl.
*G06F 3/048* (2013.01)
*G06F 3/0482* (2013.01)
*G06F 3/0481* (2013.01)
*G06F 3/0488* (2013.01)

(52) U.S. Cl.
CPC .......... *G06F 3/0482* (2013.01); *G06F 3/04817* (2013.01); *G06F 3/04883* (2013.01)

(58) Field of Classification Search
CPC ................ G06F 3/04817; G06F 3/048; H04N 7/155–7/157; H04L 12/1822
USPC ......................................... 715/766, 763, 790
See application file for complete search history.

(56) References Cited

U.S. PATENT DOCUMENTS

| | | | | |
|---|---|---|---|---|
| 5,060,135 A * | 10/1991 | Levine et al. | ................. | 715/769 |
| 5,349,658 A * | 9/1994 | O'Rourke | ............. | G06F 3/0481 715/775 |
| 6,816,176 B2 * | 11/2004 | Laffey et al. | ................. | 715/860 |
| 6,886,138 B2 * | 4/2005 | Laffey et al. | ................. | 715/860 |
| 7,007,070 B1 * | 2/2006 | Hickman | ...................... | 709/208 |
| 7,487,467 B1 * | 2/2009 | Kawahara et al. | ............. | 715/810 |
| 2003/0007017 A1 * | 1/2003 | Laffey et al. | ................. | 345/862 |
| 2003/0117440 A1 * | 6/2003 | Hellyar et al. | ................. | 345/767 |
| 2005/0010876 A1 * | 1/2005 | Robertson | ............. | G06F 3/0481 715/782 |
| 2005/0210118 A1 * | 9/2005 | Hickman et al. | .............. | 709/208 |
| 2005/0283742 A1 * | 12/2005 | Gusmorino et al. | ........... | 715/839 |
| 2006/0041846 A1 * | 2/2006 | Masselle et al. | ............... | 715/793 |
| 2006/0161861 A1 * | 7/2006 | Holecek et al. | ................ | 715/782 |
| 2006/0161868 A1 * | 7/2006 | Van Dok et al. | ............... | 715/835 |
| 2008/0168403 A1 * | 7/2008 | Westerman et al. | ........... | 715/863 |
| 2008/0307359 A1 * | 12/2008 | Louch et al. | .................... | 715/835 |
| 2008/0307360 A1 * | 12/2008 | Chaudhri et al. | .............. | 715/835 |
| 2008/0307364 A1 * | 12/2008 | Chaudhri et al. | .............. | 715/836 |
| 2009/0061837 A1 * | 3/2009 | Chaudhri et al. | .............. | 455/418 |
| 2009/0164923 A1 * | 6/2009 | Ovi | ............................... | 715/764 |
| 2010/0083111 A1 * | 4/2010 | De Los Reyes | ................ | 715/702 |
| 2010/0138784 A1 * | 6/2010 | Colley | ........................... | 715/810 |
| 2010/0248787 A1 * | 9/2010 | Smuga et al. | .................. | 455/566 |
| 2011/0119627 A1 * | 5/2011 | Cho et al. | ....................... | 715/811 |
| 2011/0252380 A1 * | 10/2011 | Chaudhri | ...................... | 715/836 |
| 2012/0210266 A1 * | 8/2012 | Jiang et al. | ..................... | 715/772 |

FOREIGN PATENT DOCUMENTS

KR 20070107828 11/2007

OTHER PUBLICATIONS

"First Office Action of China Counterpart Application", issued on Aug. 12, 2010, p. 1-p. 4, in which the listed reference was cited.

* cited by examiner

*Primary Examiner* — Ryan Pitaro
(74) *Attorney, Agent, or Firm* — Jianq Chyun IP Office

(57) ABSTRACT

An icon operation method is provided. The method is suitable for a display displaying an operation option image having several icons. Each icon represents an operation. The method comprises steps of grouping some of the icons so that the icons in the same group are partially stacked with each other.

16 Claims, 9 Drawing Sheets

ICON OPERATION METHOD AND ICON OPERATION MODULE

CROSS-REFERENCE TO RELATED APPLICATION

This application claims the priority benefit of Taiwan application serial No. 97133446, filed on Sep. 1, 2008. The entirety of the above-mentioned patent application is hereby incorporated by reference herein and made a part of this specification.

BACKGROUND OF THE INVENTION

1. Field of the Invention

The invention relates to an icon operation method, and more particularly, to an icon operation method on a miniaturized display.

2. Description of Related Art

Generally, an electronic apparatus or application software on the market is designed with a human-machine interface for a user to execute various functions of the electronic apparatus conveniently. Since a size of a hard drive is limited, various function options of all electronic apparatuses can not represented completely in a displaying region of the same hard drive. Therefore, the human-machine interface has to be simplified; that is, limited numbers of main function options or path tags are disposed within a visible region of a current display. Alternatively, other secondary options are hidden under various main function options or sub-directories of the main path tags in a manner of sub-options.

Thus, when operating the electronic apparatus or application software, the user is usually required to operate through multiple directories and paths to find the needed option to further perform the operation. Moreover, the icon representing each main directory and path is usually over-simplified or can not express the directory, path, or operation function clearly, so that the user is not capable of finding the directory to be opened or the function operation to be executed merely in one blink of an eye in a selection list having various icon options. Hence, the difficulty for the user to operate the electronic apparatus is enhanced and the time for the user to operate the options in the selection list is increased. In addition, when the user is unfamiliar with operation of the electronic apparatus or application software, the user has to search for the function or path to be selected in the directories under various main options, thereby reducing the user's interest to operate this electronic apparatus or application software.

SUMMARY OF THE INVENTION

The invention is directed to an icon operation method capable of simplifying an operation option image, so that more icons are displayed within a single visible scope of a display.

The invention is further directed to an icon operation module capable of grouping a portion of icons arranged and displayed in an operation option image to enhance a number of icons to be displayed within a single visible scope of a display.

The invention is directed to an icon operation method suitable for a display displaying an operation option image having a plurality of icons. Moreover, each of the icons represents an operation. This method includes grouping a portion of the icons so that the icons in the same group are partially stacked on each other.

According to the icon operation method in an embodiment of the invention, the method further includes selecting one of the icons, executing the operation represented by the selected icon, and displaying a user interface window of the operation on the display. When the user interface window is switched to the operation option image on the display, the selected icon is modified into a screen capture thumbnail of the user interface window before switching to the operation option image.

According to the icon operation method in an embodiment of the invention, the method of switching from the user interface window to the operation option image includes terminating the operation represented by the selected icon.

According to the icon operation method in an embodiment of the invention, the method of switching from the user interface window to the operation option image includes minimizing the user interface window.

According to the icon operation method of the invention, the method of displaying the user interface window of the operation on the display includes expanding the icon to a full screen size of the display directly.

According to the icon operation method of the invention, the method of grouping the icons includes selecting a portion of the icons with a gesture figure mode on the display. The gesture figure mode further includes at least two input apparatuses respectively located on two terminals of the icons to be grouped on the display, and the input apparatuses simultaneously move to a set point in opposing directions on the display to group the icons.

According to the icon operation method of the invention, the method further includes when one input apparatus points to one of the icons in the same group through the display, the pointed icon popping out from the stacked and grouped icons.

According to the icon operation method of the invention, the method further includes selecting the icons in the same group with one input apparatus through the display to expand the icons in the same group.

According to the icon operation method of the invention, the method further includes at least two input apparatuses simultaneously located on a set point of the icons in the same group on the display, and the input apparatuses move away from the set point simultaneously in opposing directions on the display to expand the icons in the same group.

The invention is further directed to an icon operation module suitable for a display displaying an operation option image having a plurality of icons. In addition, each of the icons represents a functional operation. This icon operation module includes a grouping signal reception module and a grouping operation module. Here, the grouping signal reception module is at least configured to receive a grouping signal, and the grouping signal includes selecting a portion of the icons. The grouping operation module groups the selected icons according to the grouping signal so that the icons in the same group are partially stacked on each other.

According to the icon operation module of the invention, the module further includes an operation selection signal reception module, a functional operation execution module, an image display module, and a modifying icon display module. The operation selection signal reception module is configured to receive an operation selection signal so as to select one of the icons. The functional operation execution module is configured to execute the functional operation represented by the selected icon. Moreover, the image display module displays a user interface window of the functional operation on the display. Furthermore, the modifying icon display module is configured to modify the selected icon into a screen capture thumbnail of the user interface window before switching to the operation option image when the user interface window is switched to the operation option image on the display.

According to the icon operation module of the invention, the modifying icon display module is configured to terminate the operation represented by the selected icon.

According to the icon operation module of the invention, the modifying icon display module is configured to minimize the user interface window.

According to the icon operation module of the invention, the image display module is configured to expand the icon to a full screen size of the display directly.

To make the above and other features and advantages of the invention more comprehensible, several embodiments accompanied with figures are detailed as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1A:
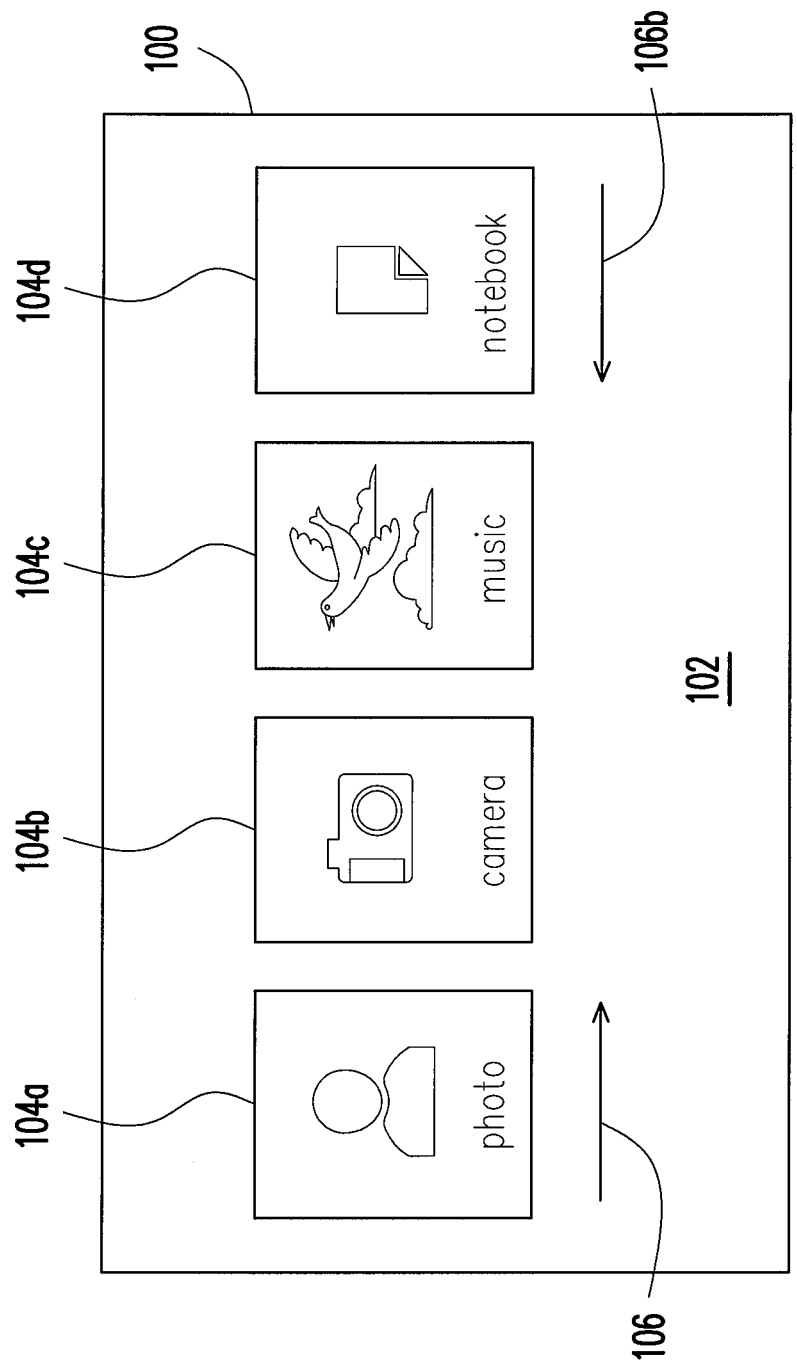
FIGS. 1A to 1B illustrate an icon operation method according to an embodiment of the invention.
Figure 1B:
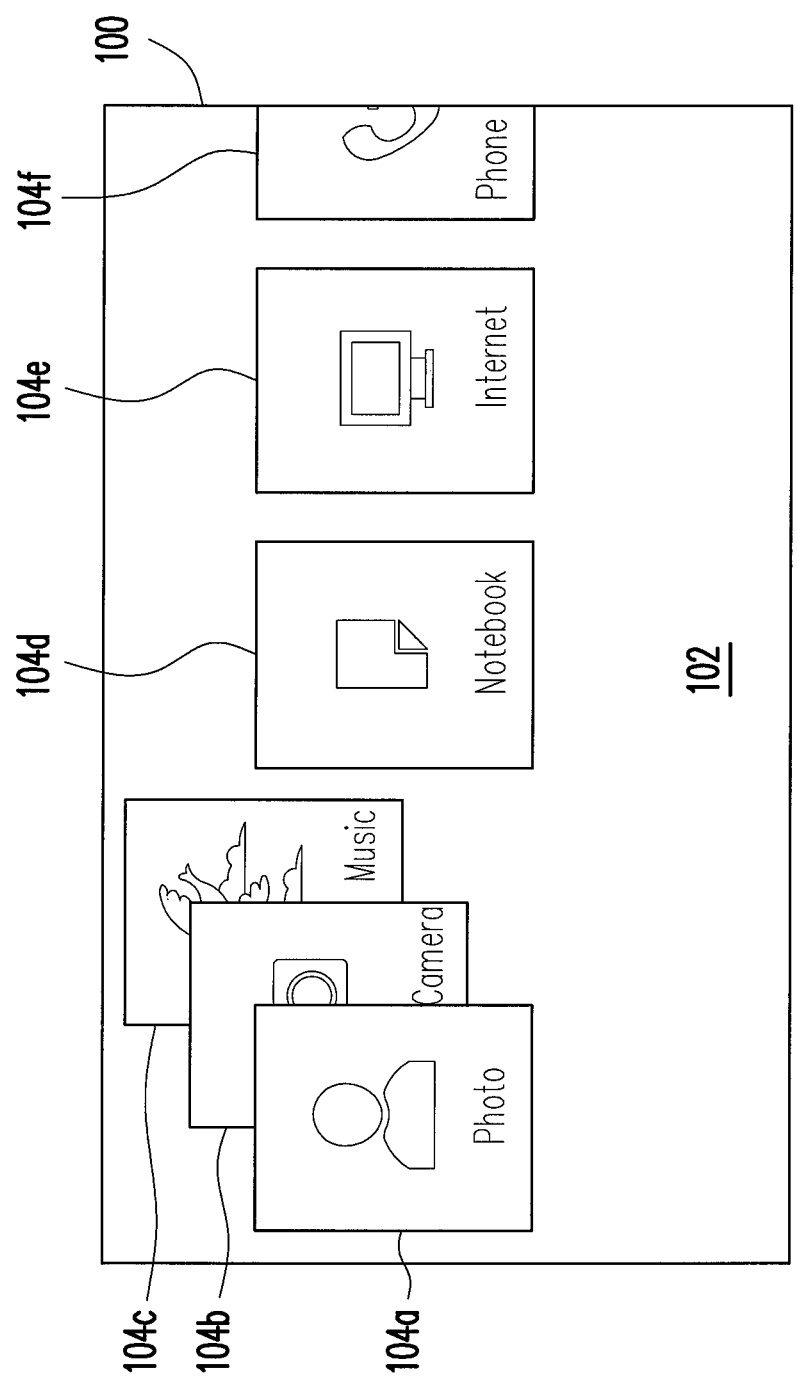
Figure 5:
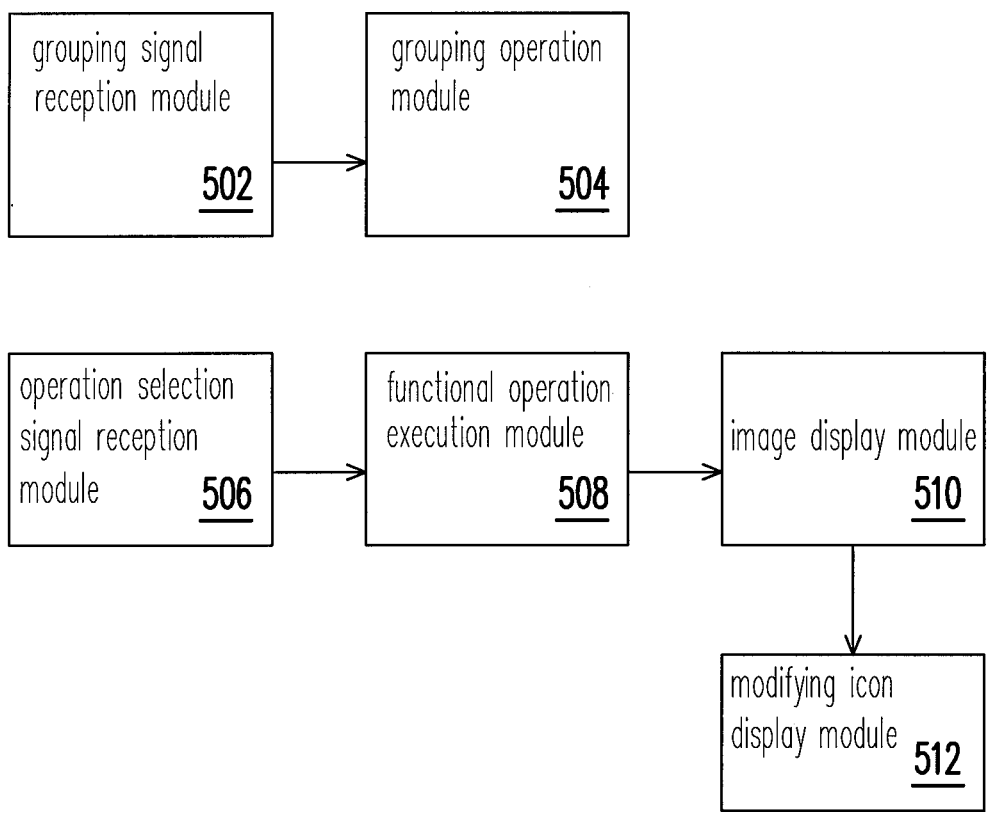
FIG. 5 illustrates an operation module according to an embodiment of the invention.

FIGS. 1A to 1B illustrate an icon operation method according to an embodiment of the invention. FIG. 5 illustrates an operation module according to an embodiment of the invention. Referring to FIG. 1A, a display 100 is provided. The display 100 displays an operation option image 102 having a plurality of icons 104a, 104b, 104c, and 104d, and each icon represents an operation. For example, the icon 104a represents a photo browsing operation, the icon 104b represents a camera function operation, the icon 104c represents a music playing operation, and the icon 104d represents a notebook function operation. Here, the display 100, for example, is a touch sensing display. The display 100 is installed in a portable device such as a mobile phone or a personal digital assistant (PDA), for instance.

Figure 2:
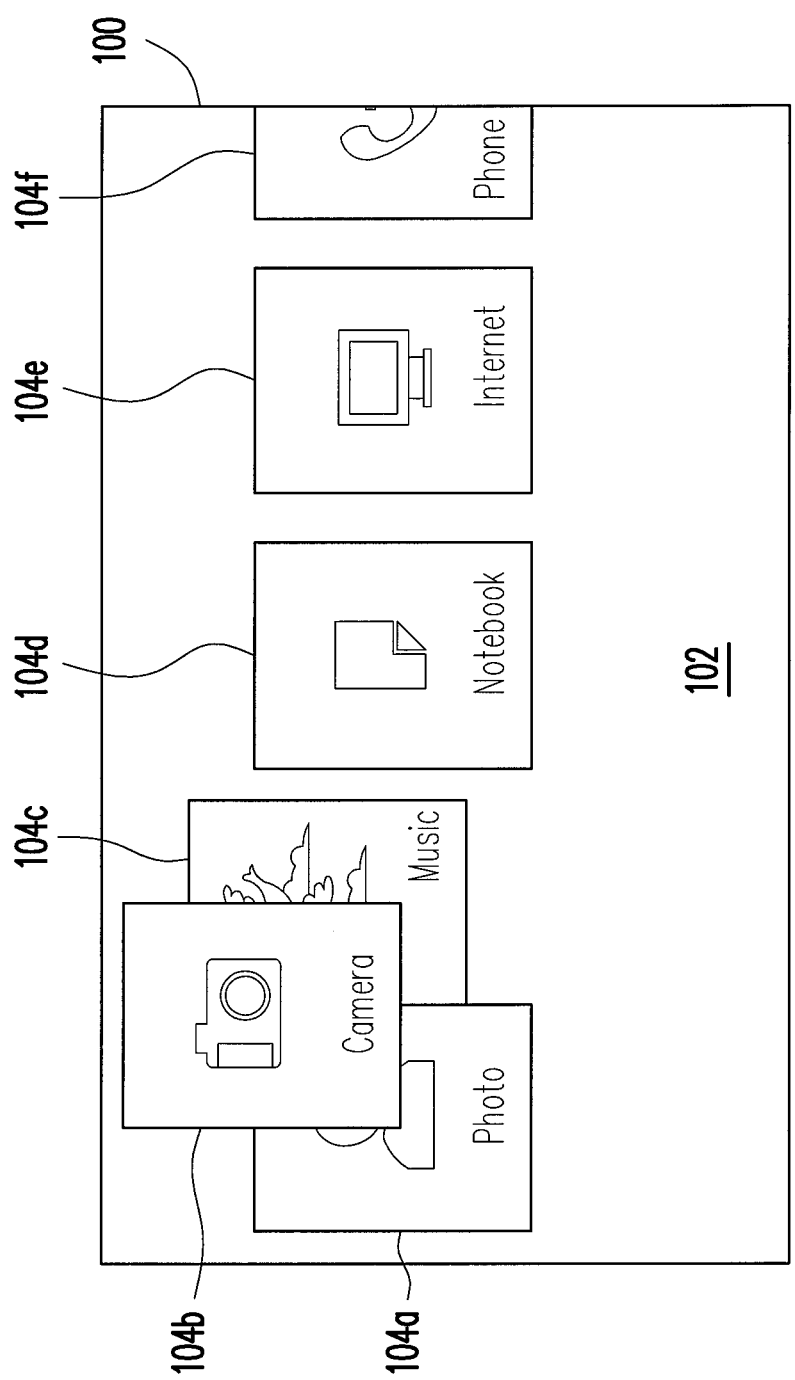
FIG. 2 illustrates an icon operation method according to an embodiment of the invention.

Referring to FIG. 1B, a portion of the icons 104a, 104b, and 104c are grouped so that the icons in the same group are partially stacked on each other. In one embodiment, in a method of grouping the icons, a portion of the icons are selected with a gesture figure mode on the display to group the selected icons, for example. In another embodiment, as shown in FIG. 1A, the gesture figure mode further includes at least two input apparatuses respectively located on two terminals of the icons (i.e. the icons 104a and 104c) to be grouped on the display 100. Additionally, the input apparatuses move to a set point in opposing directions (as illustrated by arrows 106a and 106b) simultaneously on the display to group the icons 104a, 104b, and 104c. Furthermore, referring to FIG. 2, when the input apparatus points to one of the icons 104a, 104b, and 104c in the same group (i.e. the icon 104b representing the camera function operation) through the display 100, the pointed icon 104b pops out from the stacked and grouped icons. Herein, the input apparatus is a stylus or finger, for example.

Figure 3A:
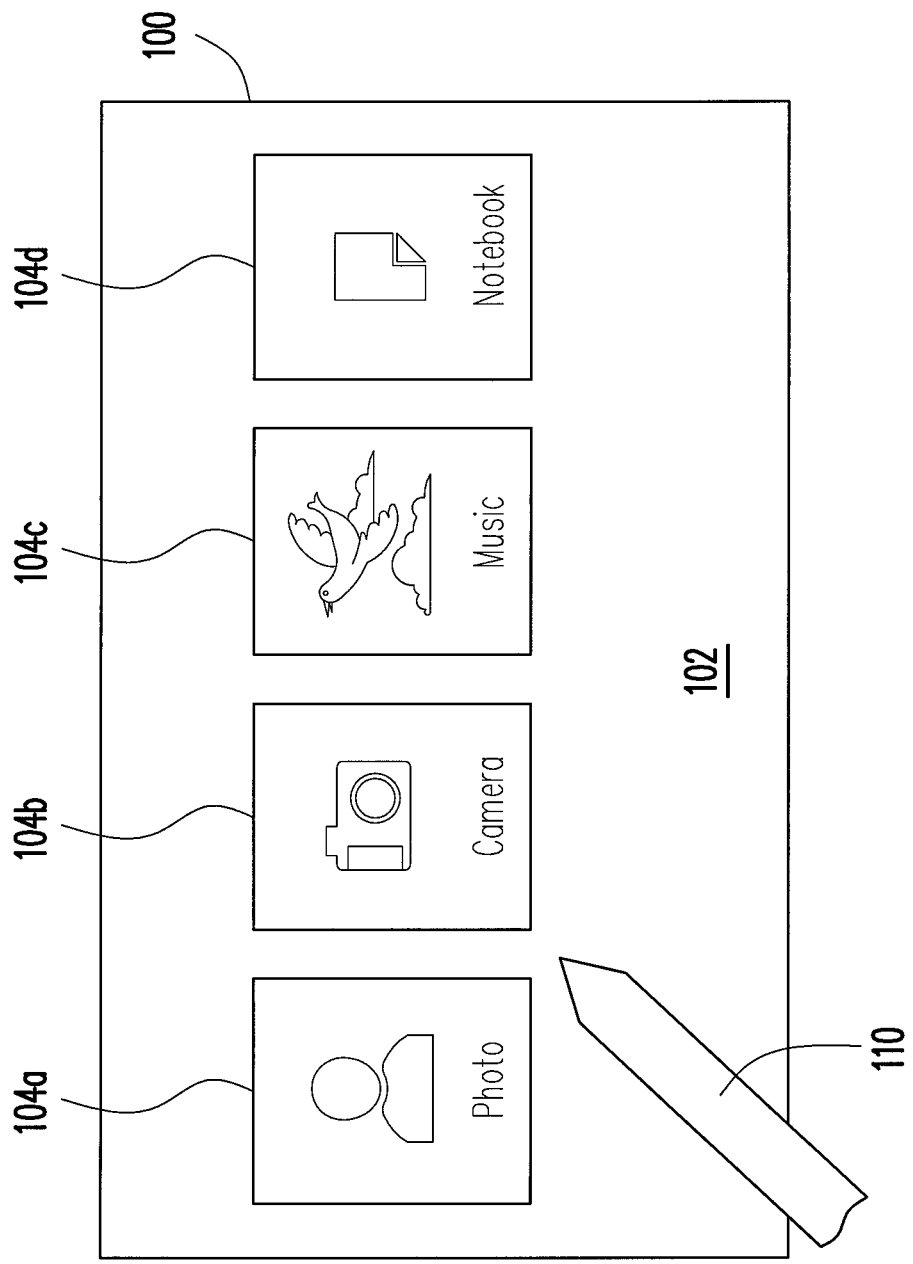
FIG. 3A illustrates a method of expanding icons in the same group according to an embodiment of the invention.
Figure 3B:
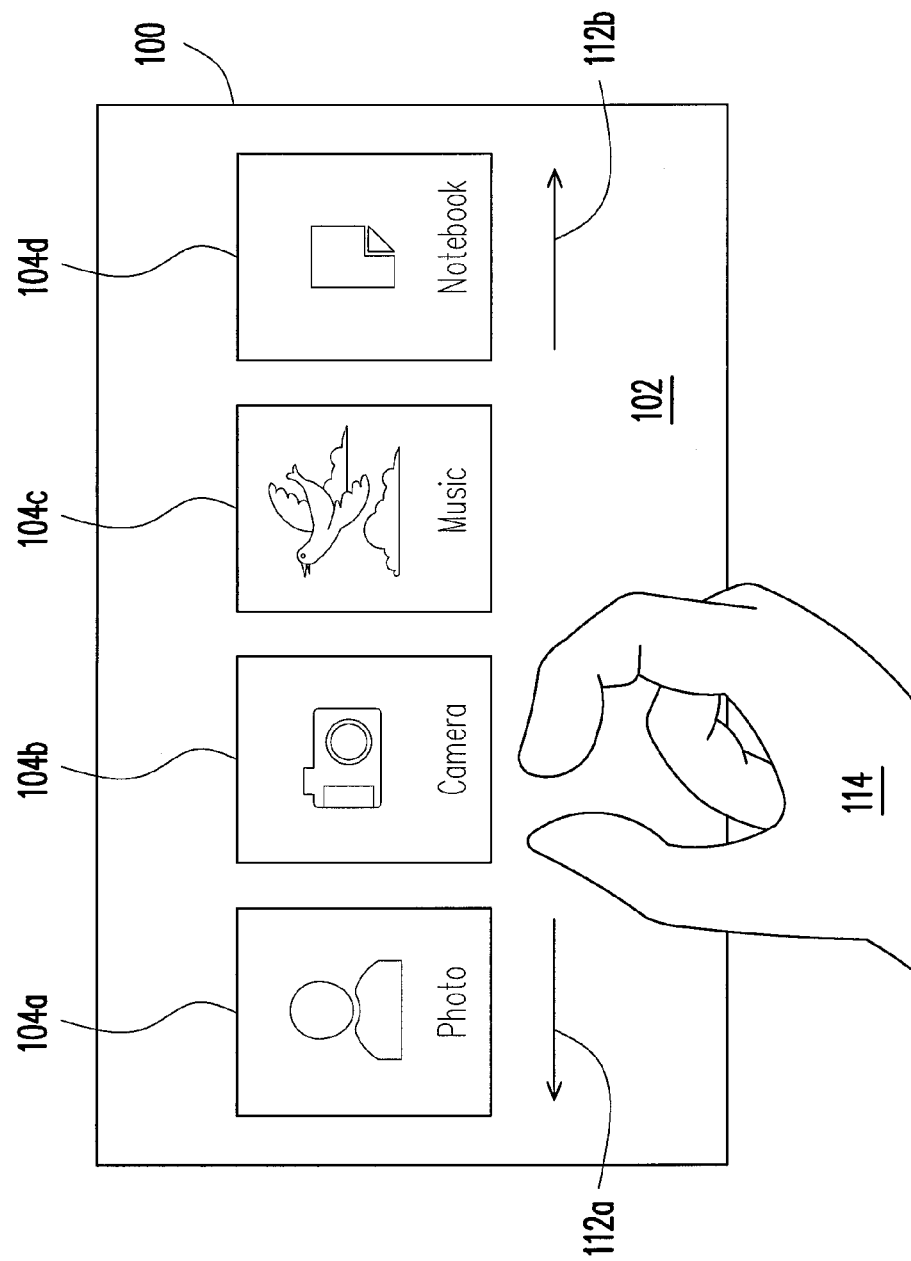
FIG. 3B illustrates a method of expanding icons in the same group according to another embodiment of the invention.

Other than the icon grouping method aforementioned, the icon operation method of the invention further includes a method of expanding the icons in the same group. FIG. 3A illustrates a method of expanding icons in the same group according to an embodiment of the invention. Referring to FIG. 3A, in this embodiment, the icons 104a, 104b, and 104c in the same group are selected using an input apparatus 110 through the display 100 to expand the icons 104a, 104b, and 104c in the same group. In this embodiment, as shown in FIG. 3A, the input apparatus is a stylus 110. FIG. 3B illustrates a method of expanding the icons in the same group according to another embodiment of the invention. Referring to FIG. 3B, in another embodiment, the method of expanding the icons in the same group also includes at least two input apparatuses located on a set point of the icons in the same group on the display 100. The input apparatuses move away from the set point in opposing directions (i.e. arrows 112a and 112b shown in FIG. 3B) simultaneously to expand the icons 104a, 104b, and 104c in the same group on the display 100. In this embodiment, the input apparatus is a finger 114 shown in FIG. 3B, for instance.

Figure 4A:
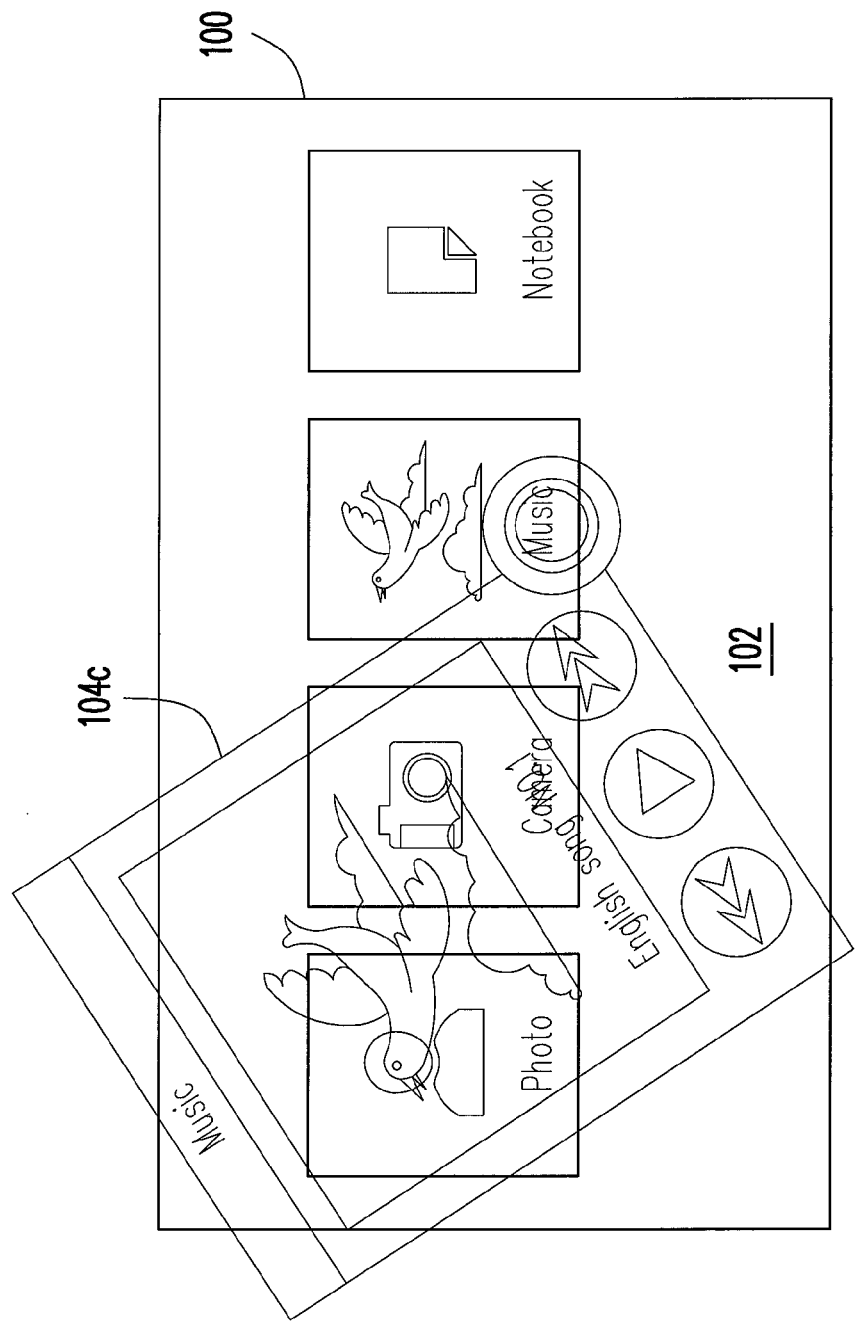
FIGS. 4A to 4D illustrate an icon operation method according to another embodiment of the invention.

The icon operation method of the invention not only includes the method of grouping the icons and the method of expanding the grouped icons, but also includes a displaying method of the icons. FIGS. 4A to 4D illustrate an icon image display method according to another embodiment of the invention. Referring to FIG. 4A, one of the icons listed in the operation option image 102 is selected. In this embodiment, the icon selected is the icon 104c representing the music playing operation. Thereafter, referring to FIG. 4A and FIG. 4B, the music playing operation represented by the selected icon 104c is executed and a user interface window 402 of the music playing operation is displayed on the display 100. Subsequently, when the user interface window 402 is switched to the operation option image 102 on the display 100, the selected icon 104c is modified into a screen capture thumbnail of the user interface window before switching to the operation option image 102.

Figure 4B:
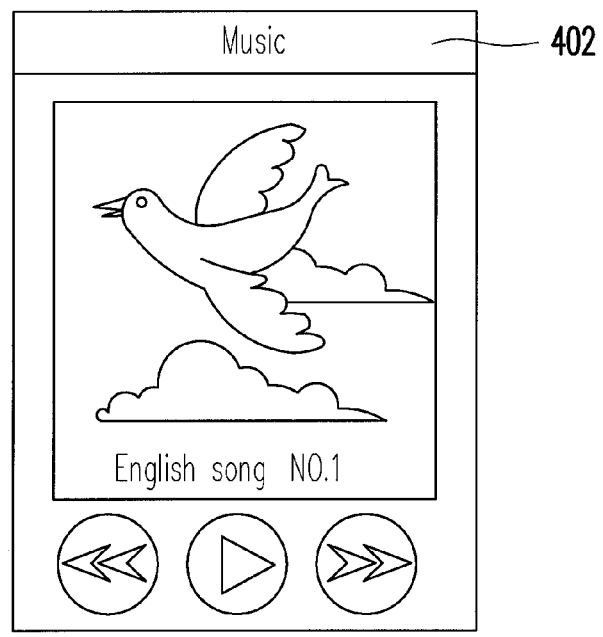
Figure 4C:
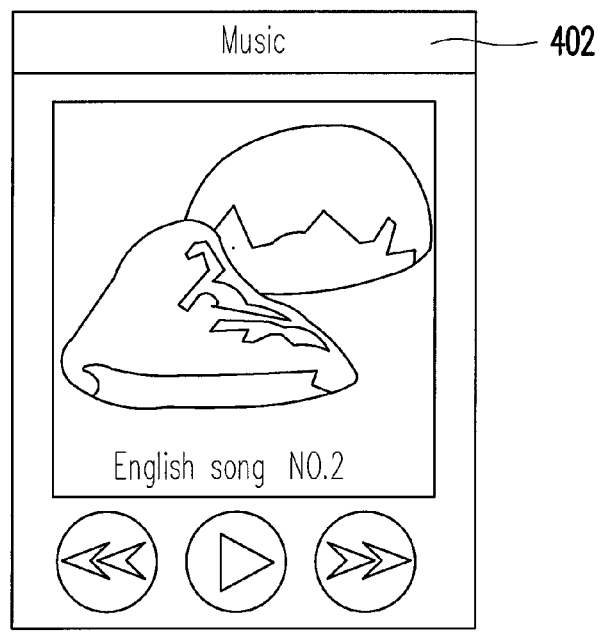
Figure 4D:
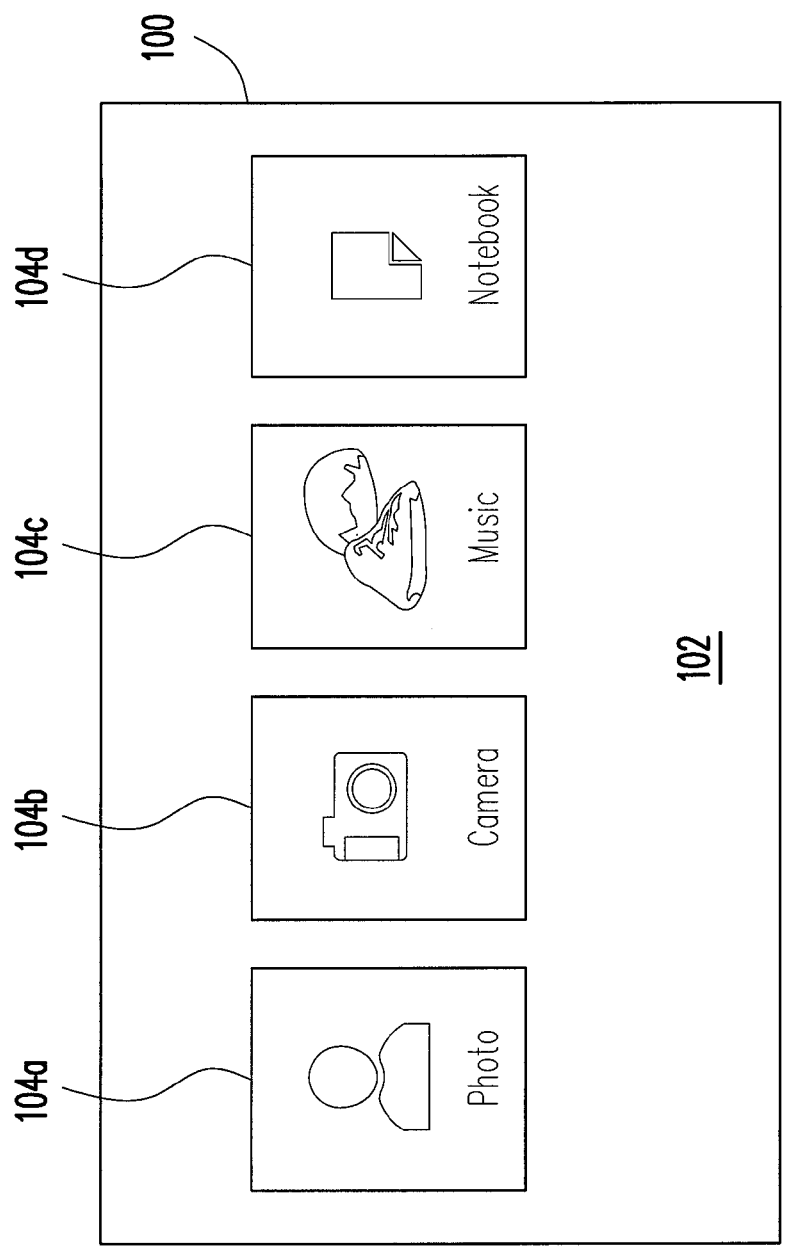

In other words, a user selects the music playing operation 104c (FIG. 4A) in the operation option image 102 and switches from the operation option image 102 to the user interface window 402 (FIG. 4B). After the music playing operation has initiated, the user switches an image representing an English song No. 1 displayed in the user interface window 402 to an image of playing an English song No. 2 (FIG. 4C) and plays the English song No. 2. During or after the playing of the English song No. 2, when the user switches from the user interface window 402 back to the operation option image 102, a screen capture of the user interface window is performed to capture an image of the user interface window before switching back to the operation option image 102 into a thumbnail. Moreover, the thumbnail on the icon 104c selected originally (that is, the thumbnail having the image of the English song No. 1 as shown in FIG. 4A) is modified into the newly captured thumbnail (that is, the thumbnail having the image of the English song No. 2 as shown in FIG. 4D) according to this thumbnail.

In the icon display method aforementioned, in the method of switching from the user interface window 402 into the operation option image 102, the operation represented by the selected icon is terminated. In one embodiment, in the method of switching from the user interface window 402 into the operation option image 102, the user interface window opened is miniaturized. Moreover, in another embodiment, in the method of displaying the user interface window of the functional operation on the display 100, the selected icon is directly expanded to a full screen size of the display 100, for example.

FIG. 5 illustrates an operation module according to an embodiment of the invention. Referring to FIG. 5, an icon operation module 500 for executing the icon operation method aforementioned is provided. The icon operation module 500 includes a grouping signal reception module 502 and a grouping operation module 504. Here, the grouping signal reception module 502 is at least configured to receive a grouping signal, and the grouping signal includes selecting a portion of the icons. In other words, the input apparatus selects at least two icons to be a grouping signal through the display 100 (FIG. 1A). The grouping operation module 504 groups the selected icons so that the icons in the same group are partially stacked on each other.

The icon operation module 500 is not only configured to execute the grouping signal reception module 502 and the grouping operation module 504 of the grouping operation, but also includes an operation selection signal reception module 506, a functional operation execution module 508, an image display module 510, and a modifying icon display module 512. Here, the operation selection signal reception module 506 is configured to receive an operation selection signal so as to select one of the icons displayed on the display 100. The functional operation execution module 508 is configured to execute the functional operation represented by the selected icon. The image display module 510 displays a user interface window 402 of the functional operation on the display 100 (FIG. 4C). The modifying icon display module 512 is configured to modify the selected icon into a screen capture thumbnail of the user interface window 402 before switching to the operation option image 102 when the user interface window 402 is switched to the operation option image 102 on the display 100.

In summary, in the icon operation method of the invention, icons representing various functional operations or paths in the operation option image are partially grouped by the grouping operation, so that the number of icons to be displayed within a single visible scope of the display is increased. Furthermore, each icon represents the thumbnail of the final image of the previous operation or changes the thumbnail on the icon along with changes in the user interface window of the function being operated. Hence, when the user is browsing the icon in the operation option image, the file to be opened or the functional operation to be executed can be easily found, thereby greatly enhancing the convenience of the icon operation method.

Although the invention has been disclosed by the above embodiments, they are not intended to limit the present invention. Anybody skilled in the art may make some modifications and alterations without departing from the spirit and scope of the invention. Therefore, the protection range of the invention falls in the appended claims.

What is claimed is:

1. An icon operation method, suitable for a display, wherein the display displays an operation option image having a plurality of icons, an application is executed in response to one of the icons being selected, another application is executed in response to another one of the icons being selected, and the icon operation method comprises:
   detecting a selection operation for selecting one of the plurality of icons;
   executing an application operation triggered by the selected icon and displaying a user interface window of the application operation on the display in response to the selection operation;
   detecting whether the application operation triggered by the selected icon is terminated while the user interface window is displayed;
   switching the user interface window to the operation option image, by closing the user interface window, in response to that the application operation triggered by the selected icon is terminated; and
   modifying the selected icon to be displayed with a screen capture thumbnail of the user interface window in response to the termination of the application operation triggered by the selected icon, wherein the screen capture thumbnail is a thumbnail of an image of the user interface window and the image is captured in response to the termination of the application operation triggered by the selected icon.

2. The icon operation method as claimed in claim 1, while the display displays the operation option image having the plurality of icons, further comprising:
   grouping a portion of the plurality of icons so that the plurality of icons in a same group is partially stacked with each other.

3. The icon operation method as claimed in claim 2, wherein the method of grouping the plurality of icons comprises selecting a portion of the plurality of icons with a gesture figure mode on the display.

4. The icon operation method as claimed in claim 3, wherein the gesture figure mode further comprises at least two input apparatuses respectively located on two terminals of the plurality of icons to be grouped on the display, and the plurality of input apparatuses simultaneously moves to a set point in opposing directions on the display to group the plurality of icons.

5. The icon operation method as claimed in claim 2, further comprising when one input apparatus points to one of the plurality of icons in the same group through the display, the pointed icon popping out from the plurality of stacked and grouped icons.

6. The icon operation method as claimed in claim 2, further comprising having at least two input apparatuses simultaneously located on a set point of the plurality of icons in the same group on the display, and the plurality of input apparatuses move away from the set point simultaneously in opposing directions on the display to expand the plurality of icons in the same group.

7. The icon operation method as claimed in claim 1, wherein the method of displaying the user interface window on the display comprises expanding the selected icon to a full screen size of the display directly.

8. The icon operation method as claimed in claim 1, further comprising selecting the plurality of icons in the same group with one input apparatus through the display to expand the plurality of icons in the same group.

9. An icon operation method, suitable for a display, wherein the display displays an operation option image having a plurality of icons, an application is executed in response to one of the icons being selected, another application is executed in response to another one of the icons being selected, and the icon operation method comprises:
   detecting a selection operation for selecting one of the plurality of icons;

executing an application operation triggered by the selected icon and displaying a user interface window of the application operation on the display in response to the selection operation;

detecting whether the application operation triggered by the selected icon is terminated while the user interface window is displayed;

switching the user interface window to the operation option image, by closing the user interface window, in response to that the application operation triggered by the selected icon is terminated; and performing a screen capture to capture an image of the user interface window in response to that the application operation triggered by the selected icon is terminated, and then modifying the selected icon to be displayed with a thumbnail of the captured image of the user interface window in response to the termination of the application operation triggered by the selected icon.

10. The icon operation method as claimed in claim 9, while the display displays the operation option image having the plurality of icons, further comprising:

grouping a portion of the plurality of icons so that the plurality of icons in a same group is partially stacked with each other.

11. The icon operation method as claimed in claim 10, wherein the method of grouping the plurality of icons comprises selecting a portion of the plurality of icons with a gesture figure mode on the display.

12. The icon operation method as claimed in claim 10, wherein the gesture figure mode further comprises at least two input apparatuses respectively located on two terminals of the plurality of icons to be grouped on the display, and the plurality of input apparatuses simultaneously moves to a set point in opposing directions on the display to group the plurality of icons.

13. The icon operation method as claimed in claim 10, further comprising when one input apparatus points to one of the plurality of icons in the same group through the display, the pointed icon popping out from the plurality of stacked and grouped icons.

14. The icon operation method as claimed in claim 10, further comprising having at least two input apparatuses simultaneously located on a set point of the plurality of icons in the same group on the display, and the plurality of input apparatuses move away from the set point simultaneously in opposing directions on the display to expand the plurality of icons in the same group.

15. The icon operation method as claimed in claim 9, wherein the method of displaying the user interface window on the display comprises expanding the selected icon to a full screen size of the display directly.

16. The icon operation method as claimed in claim 9, further comprising selecting the plurality of icons in the same group with one input apparatus through the display to expand the plurality of icons in the same group.

* * * * *